United States Patent [19]

Takiguchi

[11] Patent Number: 4,767,207
[45] Date of Patent: Aug. 30, 1988

[54] APPARATUS FOR MEASURING TRANSMISSION CHARACTERISTICS OF AN OPTICAL FIBER

[75] Inventor: Yoshihiro Takiguchi, Shizuoka, Japan

[73] Assignee: Hamamatsu Photonics K.K., Shizuoka, Japan

[21] Appl. No.: 796,206

[22] Filed: Nov. 8, 1985

[30] Foreign Application Priority Data

Nov. 9, 1984 [JP] Japan ................................ 59-237348

[51] Int. Cl.$^4$ ........................ G01N 21/84; G01D 3/42
[52] U.S. Cl. ............................ 356/73.1; 250/213 VT; 356/319
[58] Field of Search .................... 356/73.1, 319; 250/213 VT

[56] References Cited

U.S. PATENT DOCUMENTS

| 4,309,105 | 1/1982 | Lebduska | 356/73.1 |
| 4,352,127 | 9/1982 | Tsuchiya | 250/213 VT |
| 4,611,920 | 9/1986 | Tsuchiya | 250/213 VT |

FOREIGN PATENT DOCUMENTS

| 137247 | 10/1981 | Japan | 356/73.1 |
| 58-148934 | 9/1983 | Japan | 356/73.1 |
| 2129548 | 5/1984 | United Kingdom | 356/318 |

OTHER PUBLICATIONS

Cohen et al., "Interferometric Measurements of Minimum Dispersion in Short Lengths of Single Mode Fibre", Electronics Letters, 6/82, pp. 564–566, vol. 18, #13.

Gulyaev et al., "Method of Measuring the Dispersion in Multimode Optical Fibers", Sov. J. of Quan Electronics 10(8) Aug. 1980, pp. 986–989.

Barthelemy et al., "New Method for Precise Characterisation of Multimode Fibers", Electronics Letters, Mar. 18, 1982, vol. 18, #6, pp. 247–249.

Primary Examiner—Vincent P. McGraw
Attorney, Agent, or Firm—Finnegan, Henderson, Farabow, Garrett and Dunner

[57] ABSTRACT

An apparatus for measuring transmission characteristics of a short optical fiber comprises a streak tube having a photoelectron-emitting surface for receiving through a connector light pulses transmitted simultaneously through a reference optical fiber and an optical fiber under test. The light pulses are generated by a laser and cause the streak tube to generate an optical output signal indicating time-wise changes in the luminance of the pulses transmitted through each of the optical fibers such that differences in light transmission characteristics between the reference optical fiber and the optical fiber under test may be determined.

10 Claims, 3 Drawing Sheets

APPARATUS FOR MEASURING TRANSMISSION CHARACTERISTICS OF AN OPTICAL FIBER

FIELD OF THE INVENTION

The present invention relates to an apparatus for measuring the transmission characteristics of an optical fiber.

BACKGROUND OF THE INVENTION

Apparatus are commercially available for measuring the transmission characteristics of an optical fiber, especially distortions in the waveform of light being transmitted through the fiber. An example of such an apparatus is hereunder described with reference to FIG. 6. As shown, a laser diode LD is driven by a laser diode drive unit to emit pulsed light. This pulsed light is incident upon one end of an optical fiber under test F and the light emerging from the other end of the fiber is converted to an electrical signal by a photodiode PD. The output of PD is amplified by an amplifier Amp for monitoring on an oscilloscope M or other suitable means. A rough estimation of the characteristics of the fiber under test can be obtained by observing the waveform on the CRT. If more accurate data are needed, the output of Amp may be digitized by an A-D converter A/D and stored in a memory for future use in performing various analyses.

The maximum time resolution that can be achieved by the system shown above is on the order of $10^2$ picoseconds and is not high enough to resolve small waveform distortions. With a view to compensating for the low time resolution of this system by magnifying waveform distortions, it is recommended that an optical fiber under test should have a length of about 1 km. Such a method, however, is incapable of accurate measurement because even a distortion that occurs in part of the 1 km long fiber is only picked up after being averaged over the length of 1 km.

OBJECTS AND SUMMARY OF THE INVENTION

An object of the present invention is an apparatus for measuring transmission characteristics of an optical fiber which is capable of accurately measuring a wide variety of characteristics of the optical fiber.

Another object of the present invention is an apparatus for measuring transmission characteristics of an optical fiber which is capable of high resolution.

A further object of the present invention is an apparatus for measuring transmission characteristics of an optical fiber that is short in length.

These and other objects are attained by an apparatus for measuring light transmission characteristics of an optical fiber comprising means for converting optical changes in the intensity of light incident upon a photoelectron-emiting surface or a photocathode thereof into an optical output signal indicating time-wise changes in the luminance of the light received by the photoelectron-emitting surface, a reference optical fiber under test having a first end connected to the photoelectron-emitting surface and a second end, an optical fiber under test having a first end connected to the photoelectron-emitting surface and a second end, means for generating short light pulses, and connector means connected to the generating means and to the second end of the reference optical fiber and the second end of the optical fiber under test to supply the light pulses to the reference optical fiber and the optical fiber under test such that the output optical signal indicates differences in light transmission characteristics between the reference optical fiber and the optical fiber under test.

BRIEF DESCRIPTION OF THE DRAWINGS

The manner in which the above objects and other objects, features, and advantages of the present invention are attained will become more apparent from the following detailed description when it is considered in view of the drawings, wherein.

DETAILED DESCRIPTION

Figure 1:
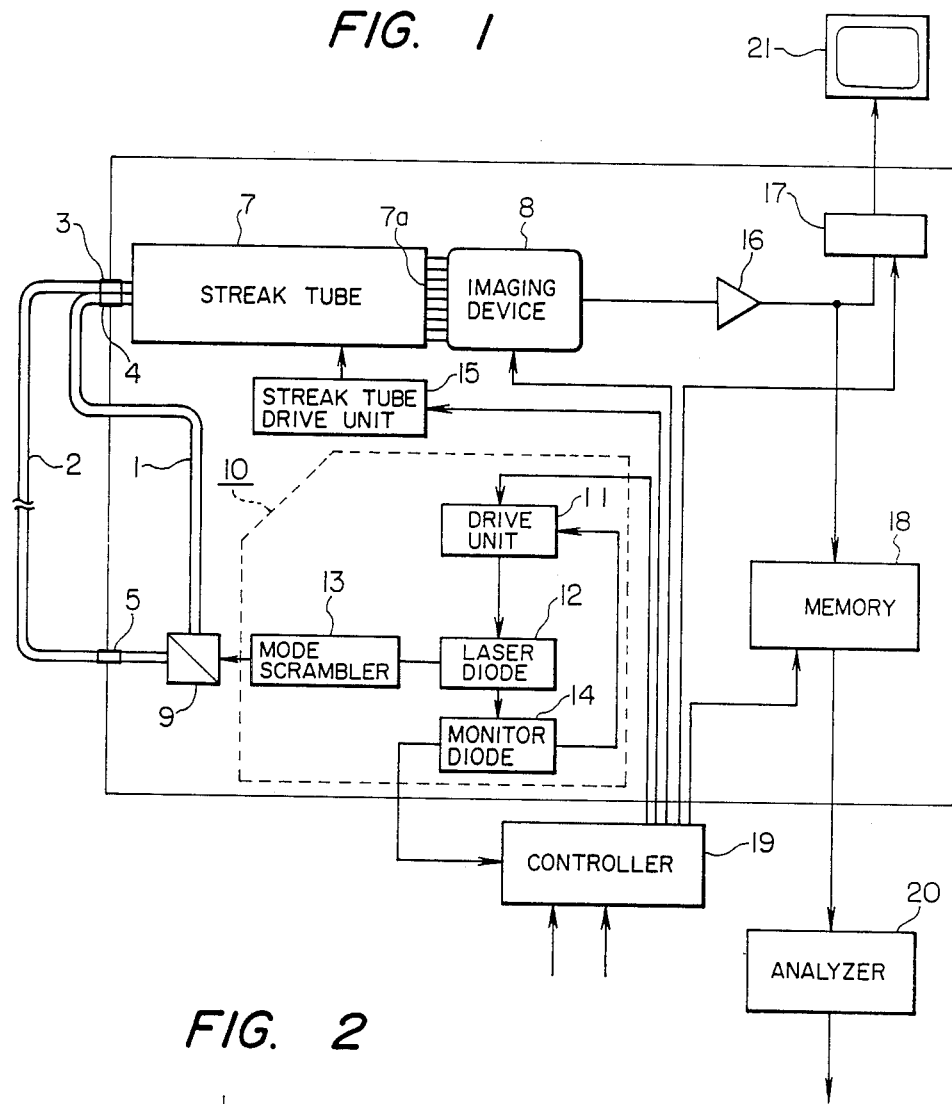
FIG. 1 is a block diagram of an apparatus for measuring the transmission characteristics of an optical fiber according to a preferred embodiment of the present invention.

FIG. 1 is a block diagram of one embodiment of the apparatus of the present invention for measuring the transmission characteristics of an optical fiber. With a view to attaining a high time resolution, the apparatus of the present invention uses a streaking means that converts a change in the intensity of light incident upon a photoelectron-emitting surface or a photocathode into a pattern of fluorescent luminance on a fluorescent screen having a time axis in sweeping direction. The streaking means includes a streak tube 7 and a streak tube drive unit 15 that applies an operating voltage and sweep voltage to the streak tube 7. The use of the streak tube 7 ensures a time resolution of up to 2 picoseconds. For example, an apparatus numbered as "C1370-01" or "C1587" consisting of a streak tube and streak tube driver manufactured by Hamamatsu Photonics K.K., which is commercially available, is suitable for achieving this time resolution. A light source 10 for generating short light pulses includes a GaAlAs or InGaAsP laser diode 12. This laser diode is driven by a laser diode driver unit 11 to generate laser pulses.

The laser diode 12 used in the embodiment shown has a wavelength range of 800 nm to 1.5 μm. Part of the laser pulses is monitored by a monitor diode 14 and the monitor output is fed back to the laser diode drive unit 11 so that the laser diode 12 will provide a constant output of light pulses. In order to match the speed of the laser diode 12, the monitor diode 14 is made of a GaAs or GaAlAs photodiode. The laser diode drive unit 11 is controlled for start and other operating modes by an output from a controller 19 which will be described later in this specification.

The output from the laser diode 12 is also passed through a mode scrambler 13 to be connected to a laser beam splitter unit 9 composed of glass beam splitters. The mode scrambler 13 consists of several turns of an optical fiber would around a mandrel with a diameter of 30 mm. The laser pulses emitted from the laser diode produces spatial distributions of the intensity and wavelength of laser light as a result of laser oscillations. The mode scrambler 13 has the function of providing a uniform intensity and wavelength distribution across the entire section of the optical fiber.

One of the laser beams issuing from the beam splitter unit 9 is connected to a reference optical fiber 1 the output end of which is connected to the photoelectron-emitting surface of the streak tube 7 by a connector 4. The other laser beam is connected to an optical fiber 2 under test. The output end of the fiber 2 is also connected to the photoelectron-emitting surface of the streak tube 7 by a connector 3.

In the embodiment shown, the reference optical fiber 1 is a multimode quartz fiber of the graded index type with a length of 1 m having core and cladding diameters of 50 $\mu$m and 125 $\mu$m, respectively. An example of such multimode optical fiber is G. 50/125-2510 available from Fujikura, Ltd. This type of optical fiber is extensively used in high-speed optical transmission and is suitable for use as a reference for the testing of general-purpose optical fibers.

A single-mode quartz optical fiber such as SM. 6/125.30 of Fujikura, Ltd., which has core and cladding diameters of 6 $\mu$m and 125 $\mu$m, respectively, may be used as a reference for the testing optical fibers for higher-speed transmission. This single-mode fiber must of course be used with a single-mode optical connector.

The reference optical fiber 1 and the optical fiber under test 2 are connected via respective connectors 4 and 3 to the streak tube 7 to be aligned with a line perpendicular to the direction in which the photoelectrons (or the electron beam) in the streak tube 7 are deflected and sweep the fluorescent screen.

An imaging device 8 is positioned in front of the fluorescent screen 7a of the streak tube 7 for taking a picture of a streak image. The output of the imaging device 8 is amplified by an amplifier 16 and fed through a monitor drive unit 17 for display on a television monitor 21. The imaging device 8 may be made of a high-sensitivity silicon intensified target (SIT) camera. The output of the amplifier 16 is stored in a memory 18.

The controller 19 is fed from an external circuit with the necessary control information (e.g. the length of a laser pulse and the speed at which the streak tube is swept) for generating signals that will sequence-control or synchronize the respective components of the apparatus of the present invention. The data stored in the memory 18 are analyzed by an analyzer 20 and read out by a suitable output device (not shown).

The apparatus described above with reference to FIG. 1 may be used to measure various transmission characteristics of an optical fiber as shown below.

Measuring the length of an optical fiber or the speed at which light propagates through the fiber:

The light source 10 is capable of generating short light pulses, and by generating pulses with a duration of 10 picoseconds, from this light source, the length of an optical fiber or the speed at which light propagates through the fiber can be measured. If both the length and material of the reference optical fiber 1 are known, the length of the optical fiber 2 and the delay time can be measured by the apparatus of the present invention.

Figure 3:
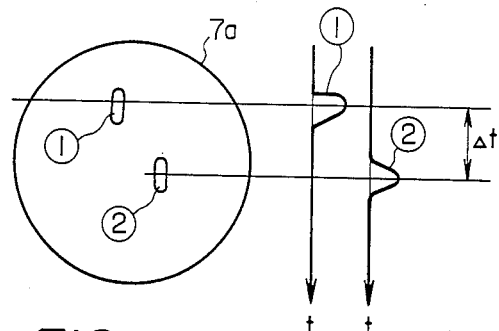
FIGS. 3 (A+B) and 4 (A+B) are schematic diagrams illustrating the principles of operation of the apparatus of FIG. 1.

Suppose that two images emerge on the fluorescent screen 7a of the streak tube 7 as shown in FIG. 3. Image (1) is due to the light issuing from the reference optical fiber 1, and image (2) results from the light coming from the optical fiber 2. If the two optical fibers are made of the same material and are identical in cross-sectional shape, the difference between the lengths of the two fibers, $\Delta l$, is given by the formula $C \cdot \Delta t$, where C is the speed of light traveling through each fiber. If the two fibers are made of different materials, the refractive-index profile of the optical fiber under test or the speed of light propagating through that fiber can be measured with the apparatus of the present invention.

Figure 4:
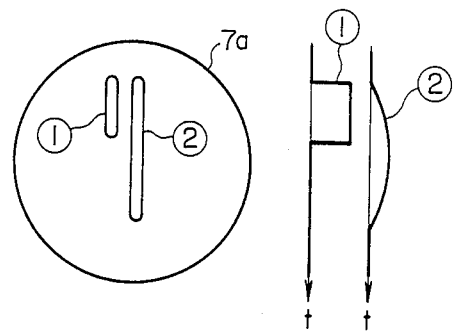

Measuring distortion in light transmission through optical fiber:

The first requirement that should be satisfied for measuring distortion in light transmission through the optical fiber 2 is to provide a reference optical fiber 1 having a cross-sectional shape identical to that of the optical fiber 2. The schematic illustration of the fluorescent screen 7a of the streak tube 7 as shown in FIG. 4 shows an image (1) due to the light issuing from the reference optical fiber and an image (2) resulting from the light coming from the optical fiber 2. By comparing the intensity distributions of the two images in the direction of the time axis, any distortion in light transmission through the optical fiber 2 can be measured.

This case of measurement assumes that the light source 10 generates light pulses with a duration of 10 picoseconds and that the fluorescent screen 7a has an effective time axis with a length of 300 picoseconds. Information such as attenuation ratio, time dispersion and distortion in transmission can be elicited by analyzing the output waveforms.

Figure 2:
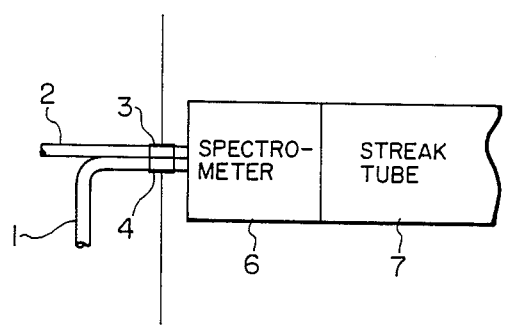
FIG. 2 is a block diagram of another embodiment of the present invention.

FIG. 2 is a block diagram showing another embodiment of the apparatus of the present invention for measuring the characteristics of an optical fiber. In FIG. 2, only the portions that differ from the embodiment in FIG. 1 are explicitly depicted. As shown, the second embodiment of the present invention is characterized by a spectrometer 6 inserted between the streak tube 7 and the reference optical fiber 1 and the fiber 2 that are connected to the spectrometer by the connector 4 and the connector 3, respectively. The spectrometer 6 provides as its output a spectrum so that intensity distributions for different wavelengths will be produced on the photoelectron-emitting surface of the streak tube 7 in a direction normal to the direction in which the photoelectrons in the streaking means are deflected and sweep the fluorescent screen.

The light source 10 generates the necessary number of light pulses to ensure satisfactory detection of any faint light component in the output spectrum. The streak tube drive unit 15 in the streaking means can apply sweep signals to the streak tube 7 synchronized with the repetitive light pulses so overlapping repetitive streak images will be obtained on the fluorescent screen 7a.

The operation of the system in accordance with the second embodiment will hereunder be described with reference to FIG. 5.

Figure 5:
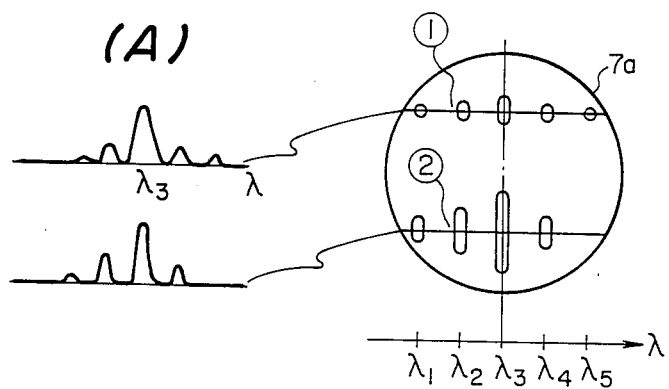
FIGS. 5 (A,B,C) are schematic diagrams illustrating the principles of operation of the apparatus of FIG. 2.
Figure 6:
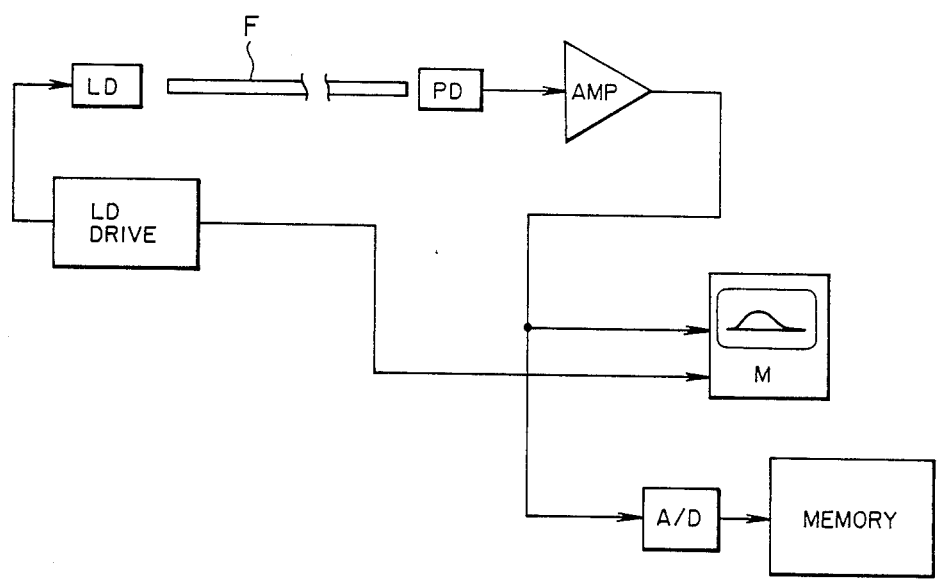
FIG. 6 is a block diagram showing a conventional apparatus for measuring transmission characteristics of an optical fiber.

Measuring transmission characteristics for different wavelengths:

Light spectra obtained by the spectrometer 15 will cause streak images to emerge on the fluorescent screen 7a as shown in FIG. 5. By comparing the image (1) due to the light transmitted through the reference optical fiber 1 with the image (2) resulting from the light transmitted through the optical fiber 2, the characteristics of light transmission through the optical fiber 2 can be compared for different wavelengths. If, as shown in FIG. 5, no image of light component at a wavelength $\lambda_5$ emerges, it can be concluded that the cutoff frequency of the optical fiber 2 lies between wavelengths $\lambda_4$ and $\lambda_5$.

Measuring Raman Scattering occurring within an optical fiber:

The Raman scattering effect will occur within every type of optical fiber because it is caused by the interaction between the constituent molecules of the optical fiber and the light that is incident upon the fiber. The Raman light is generated in a quantity proportional to the intensity of incident light and is affected by the fiber's transmission loss. The wavelength of the Raman light is approximately 50 nm longer than the wavelength of the incident light, so that Raman scattering can be quantitatively evaluated by measuring the intensity and temporal distributions of the Raman spectra obtained by the spectrometer 6.

The two embodiments described above may be modified in various ways that will not depart from the scope and spirit of the present invention as set forth in the appended claims. In each of the embodiments shown above, the imaging device 8 is made of a SIT camera but satisfactory results can be obtained by using a solid-state imaging device such as two-dimensional CCD camera.

As described above, the apparatus of the present invention is so constructed that light pulses transmitted through each of the reference optical fiber and the optical fiber under test will be detected by the streak tube. This arrangement enables the measurement of the transmission characteristics of short optical fibers, which has been impossible with the prior art apparatus. Measurement of optical transmission characteristics for different wavelengths has the advantage in that many parameters (e.g. wavelength, intensity, delay time and wavelength-dispersion in the fiber) can be measured simultaneously for a plurality of wavelehgths.

What is claimed is:

1. An apparatus for measuring transmission characteristics of an optical fiber comprising:
   means for converting changes in the intensity of light incident upon a photoelectron-emitting surface thereof into an optical output signal indicating time-wise changes in the luminance of said light received by said photo-electron emitting surface, said electron-emitting surface having first and second portions;
   means for generating short light pulses;
   a spectrometer having an output connected to said photoelectron-emitting surface of said converting means, said spectrometer having an input for receiving said light pulses and for suplying in response thereto said said output an optical spectrum having an intensity distribution with respect to wavelength;
   a reference optical fiber having a first end connected to said input of said spectrometer to produce a first optical spectrum on said first portion, said reference optical fiber also having a second end;
   an optical fiber under test having a first end connected to said input of said spectrometer to produce a second optical spectrum on said second portion, said optical fiber under test also having a second end; and
   connector means connected to said generating means and to said second end of said reference optical fiber and said second end of said optical fiber under test to supply simultaneously said light pulses to said reference optical fiber and said optical fiber under test such that said optical output signal includes spatially separated representations of said first and second optical spectrums which indicate differences in the light transmission characteristics between said reference optical fiber and said optical fiber under test.

2. An apparatus according to claim 1, wherein said optical output signal indicate temporal dispersion and waveform distortion of said optical fiber under test at different wavelengths of said light pulses transmitted through said optical fiber under test.

3. An apparatus according to claim 1, wherein said output optical signal indicates the optical cutoff of said optical fiber under test.

4. An appatatus for measuring light transmission characteristics of an optical fiber comprising:
   a streak tube for converting changes in the intensity of light incident upon a photoelectron-emitting surface thereof into an optical output signal indicating time-wise changes in the luminance of said light received by said photoelectron-emitting surface;
   a reference optical fiber having a first end connected to said photoelectron-emitting surface and a second end;
   an optical fiber under test having a first end connected to said photoelectron-emitting surface and a second end;
   means for generating short light pulses; and
   connector means connected to said generating means and to said second end of said reference optical fiber and said second end of said optical fiber under test to supply said light pulses to said reference optical fiber and said optical fiber under test such that said optical output signal indicates differences in light transmission characteristics between said reference optical fiber and said optical fiber under test.

5. An apparatus according to claim 4, wherein said connector means includes a beam splitter.

6. An apparatus according to claim 4, wherein said generating means comprises a laser.

7. An apparatus according to claim 4, wherein said optical output signal indicates temporal dispersion and waveform distortions in the light transmission characteristics of said optical fiber under test with respect to said reference optical fiber.

8. An apparatus for measuring light transmission characteristics of an optical fiber comprising:
   a streak tube for converting changes in the intensity of light incident upon a photoelectron-emitting surface thereof into an optical output signal indicating time-wise changes in the luminance of said light received by said photoelectron-emitting surface;
   a reference optical fiber having a first end connected to said photoelectron-emitting surface and a second end;
   an optical fiber under test having a first end connected to said photoelectron-emitting surface and a second end;
   means for generating short light pulses;
   connector means connected to said generating means and to said second end of said reference optical fiber and said second end of said optical fiber under test to supply simultaneously said light pulses to said reference optical fiber and said optical fiber under test; and
   an imaging device for producing optical images of said optical output signal produced by said streak tube.

9. An apparatus according to claim 8, further including memory means for storing said optical images produced by said imaging device.

10. An apparatus according to claim 9, wherein said generating means comprises a laser.

* * * * *